United States Patent [19]
Gamble et al.

[11] Patent Number: 6,014,632
[45] Date of Patent: Jan. 11, 2000

[54] APPARATUS AND METHOD FOR DETERMINING INSURANCE BENEFIT AMOUNTS BASED ON GROUPINGS OF LONG-TERM CARE PATIENTS WITH COMMON CHARACTERISTICS

[75] Inventors: Michael R. Gamble, Woodridge, Ill.; Jerry D. Wilson, Kirkland, Wash.

[73] Assignee: Financial Growth Resources, Inc., Woodridge, Ill.

[21] Appl. No.: 08/843,345

[22] Filed: Apr. 15, 1997

[51] Int. Cl.[7] .................................................... G06F 17/60
[52] U.S. Cl. ..................................................... 705/4; 705/2
[58] Field of Search ................................. 705/4, 2, 3, 10

[56] References Cited

U.S. PATENT DOCUMENTS

| | | | |
|---|---|---|---|
| 4,667,292 | 5/1987 | Mohlenbrock et al. | 705/4 |
| 4,831,526 | 5/1989 | Luch et al. | 705/4 |
| 5,235,507 | 8/1993 | Sachlet et al. | 705/4 |
| 5,446,653 | 8/1995 | Miller et al. | 705/4 |
| 5,523,942 | 6/1996 | Tyler et al. | 705/4 |

OTHER PUBLICATIONS

Fries, B. E. et al. "A comprehensive payment model for short– and long–stay psychiatric patients." Health Care Financing Review, vol. 15, No. 2, (Winter), pp. 31–50, 1993.
American Travellers Life Insurance Company, Long Term Care Insurance Policy Form ATL–LTC–6–IL.
Continental Casualty Company, Long Term Care Insurance Policy Form P1–21300–A (Annotated Specimen Contract).
Kanawha Insurance Company, Long Term Care Insurance Policy Form 80650.
Mutual Protective Company, Long Term Care Insurance Policy Form MP–LT692.
Pioneer Life Insurance Company of Illinois, Home Health Care Insurance Policy Form IHP–9468.
The Travelers Insurance Company, Long Term Care Insurance Policy Form LTC3.
Fries, B.E.: Letter to Carl J. Schramm, President, Health Insurance Association of America, Sept. 25, 1987.
New York State Department of Health Care Standards. "Resource Utilization Groups System: Nursing Home Reimbursement in New York State." (booklet) Jul. 1986.
Grimaldi, Paul L.: "The time is ripe for case–mix payments." *HealthWeek* p. 25, Jun. 6, 1988.
Morris, J.N., Hawes, C., Fries, B.E., et al.: "Designing the National Resident Assessment Instrument for Nursing Homes." The Gerontologist 30(3):293–307, 1990.
Clauser, S.B. and Fries, B.E.: "Nursing Home Resident Assessment and Case–Mix Classification: Cross–National Perspectives." *Health Care Financing Review* 13(4): 135–54, Summer 1992.

(List continued on next page.)

*Primary Examiner*—Allan R. MacDonald
*Assistant Examiner*—Michele Stuckey Crecca
*Attorney, Agent, or Firm*—Peter K. Trzyna, Esq.

[57] ABSTRACT

A method for using a digital electrical apparatus to electrically process signals in generating output for insurance documentation, the method including the steps of: in a digital electrical computer apparatus comprising a digital computer having a processor, the processor electrically connected to a memory device for storing and retrieving operations including machine-readable signals in the memory device, to an input device for receiving input data and converting the input data into input electrical data, to a visual display unit for converting output electrical data into output having a visual presentation, to a printer for converting the output electrical data into printed documentation, wherein the processor is programmed to control the apparatus to receive the input data and to produce the output data by steps including: defining a plurality of patient categories; and for each of the categories, determining a periodic duration-specific insurance benefit amount for long-term care patients; the method further including the step of inserting the periodic duration-specific insurance benefit amounts in a long-term care insurance policy.

17 Claims, 2 Drawing Sheets

OTHER PUBLICATIONS

Fries, B.E., et al.: "Refining a Case–Mix Measure for Nursing Homes: Resource Utilization Groups (RUG III)." Unpublished Jun. 26, 1992.

Fries, B.E., et al.: "Mental Dysfunction and Resource Use in Nursing Homes." Unpublished Sep. 23, 1992.

Fries, B.E., et al.: "Refining a Case–Mix Measure for Nursing Homes: Resource Utilization Groups (RUG–III)" Medical Care 32(7):668–85, 1994.

Williams, B.C., Fries, B.E., et al.: "Activities of Daily Living and Costs in Nursing Homes." *Health Care Financing Review* (15(4): 117–35, Summer 1994.

Schultz, B.M., et al.: "RUG–II Impacts on Long–Term Care Facilities in New York." *Health Care Financing Review* 16(20)85–99, Winter 1994.

"Creating a MEDPAR Analog to the RUG–III Classification System." *Health Care Financing Review* 16(2):101–26, Winter 1994.

"Proposed Medicare Skilled Nursing Facility Prospective Payment System." *Health Care Financing Review* 78–9, 1995 Statistical Supplement.

"Distribution of Medicare Covered Skilled Nursing Facility Stays, by State of Provider and Major RUG–III Groups: Calendar Year 1993." *Health Care Financing Review* 258–9, 1995 Statistical Supplement.

"Distribution of Medicare Covered Skilled Nursing Facility Stays, by State of Provider and Major RUG–III Groups: Calender Year 1994." *Health Care Financing Review* 294–5, 1996 Statistical Supplement.

Hawes, C., Fries, B.E., et al.: "Reliability Estimates for the Minimum Data Set for Nursing Home Resident Assessment and Care Screening (MDS)." The Gerontologist Apr. 1995.

Head, B., et al.: "Outcomes for Home and Community Nursing in Integrated Delivery Systems." *Caring Magazine* pp. 50–56, Jan. 1997.

APPARATUS AND METHOD FOR DETERMINING INSURANCE BENEFIT AMOUNTS BASED ON GROUPINGS OF LONG-TERM CARE PATIENTS WITH COMMON CHARACTERISTICS

I. TECHNICAL FIELD OF THE INVENTION

The present invention is in the field of digital electrical apparatus and method for making and using the same for application relating to insurance. More particularly, the present invention is directed to an apparatus and method for automated determination of benefit amounts, and automated generation of documentation, for long-term care insurance plans.

II. BACKGROUND OF THE INVENTION

Long-term care insurance policies were first offered to the public by insurance companies at about the time when Medicare came into being in 1966, a time in which the insurance industry was not known as being in the vanguard of computerization. These first policies were developed when almost everyone confined to a nursing home was elderly and unable to take care of themselves because of chronic cognitive or physical impairments. That is, their health conditions had deteriorated to the point that they were no longer able to take care of themselves without the assistance of another person. They were not expected to recover from those conditions. And, health care provided in a patient's home by skilled medical professionals was virtually non-existent.

As a result, the first long-term care insurance policies covered only nursing home care. Pricing the policies was difficult because there was very little data—seemingly only the average length of stay and average daily cost of care was available to assist insurers. Further, computer modeling techniques and predictive tools apparently were not being utilized. Thus, the fast policies provided fixed benefits without regard to patients' actual health conditions, that is, their medical, physical, and mental states of health.

Under a fixed-benefit arrangement, insured persons select a specific benefit amount at the time they apply for a policy. The benefit amount could be expressed as a daily, weekly, monthly, or other periodic manner. The benefit amount could also be expressed as a flat amount that, upon qualification, will be paid regardless of the cost of the care received. Or, it could be expressed as a periodic limit in which case a patient's qualified expenses will be paid up to that limit. Under a fixed-benefit arrangement, neither the flat amount nor the limit could be increased solely because a patient's health condition deteriorated after the patient qualified for benefits.

Sales of such nursing home policies remained low for almost twenty years, resulting in a corresponding low demand for advances in computer science as applied to such policies. Other than minor improvements, the policies continued to provide only nursing home benefits until two things occurred. First, surveys showed that 75% to 80% of all seniors strongly preferred to receive care at home; only 1% to 2% preferred a nursing home.

Second, beginning in October 1983, in response to rapidly rising hospital costs, Medicare began to reimburse hospitals using a prospective payment system based on Diagnosis Related Groups (DRGs). Before this change, seniors covered by Medicare remained hospitalized until, in most cases, they required only minimal assistance after discharge; this provided hospitals with a very strong financial incentive to keep patients hospitalized for as long as possible. But under the prospective payment system, each patient was assigned to one of 472 different DRGs, each of which had a specific dollar amount allotted to it. The dollar amount was based on the relative severity of the medical condition for the average patient. Except in extraordinary cases, Medicare paid the hospital that dollar amount for the patient's treatment, regardless of the severity of the patient's actual medical condition. In most cases, if the patient remained hospitalized too long, the hospital spent more for the patient's care than it received from Medicare.

Thus for the first time, hospitals had a very strong financial incentive to release patients before their Medicare money ran out. In 1968, the average hospital stay for seniors was 14.2 days; in 1982, the last year full before the prospective payment system was implemented, the average hospital stay had dropped to 10.1 days; and in 1996, the average hospital stay was only 6.6 days.

Today, almost half of all senior patients need skilled medical care—care that cannot be provided by friends or family—during their recovery after release from a hospital. Technological advances now allow most care provided in a nursing home to be provided in patients' homes. Thus, whether patients recover in a nursing home or in their own home now depends more often on what they can afford. Because home health care for recuperating patients is frequently more expensive than nursing home care, and because the combination of Medicare and private Medigap insurance policies can pay 100% of the costs for nursing home care during the first one hundred days, most recuperating patients are sent to nursing homes even though 75% to 80% strongly prefer to recover at home.

Whereas 30 years ago most nursing home patients were old, feeble, and at the end of their lives, today's "quicker and sicker" hospital discharges have dramatically changed the type of patients in nursing homes. Today, approximately 72% of the seniors who are sent to nursing homes typically stay for less than 90 days while they receive skilled medical care to recover after a hospital confinement. Contrary to the fears of many seniors, nursing homes are no longer "the end of the road;" indeed, 91% of Medicare's nursing home patients recover and are sent home to resume their lives.

However, the inventors herein believe that the insurance industry did not adequately respond to the shift in the delivery of health care services. Newer versions of the old policies did include benefits for home health care, but with very little reliable information available to actuaries, insurers simply extended their old concepts for nursing home benefits to the new home health care benefits and increased their premiums accordingly. The insurers did not change the way they determined benefit amounts for nursing home care, irrespective of the wide variance in the costs of providing care for seniors with different health conditions.

At first, most companies limited home health care benefits to 50% of the amounts payable for nursing home care, but the policies still did not sell very well: They were too expensive for most people. Gradually, companies began to offer newer policies in which home health care was optional, and other policies that provided only home health care benefits. And, many companies began to offer equal benefit amounts for both home health care and nursing home care. While the rate of sales did increase somewhat, only about 2% of people age 50 and older are covered by these policies even though long-term care represents the largest potentially devastating financial risk for most seniors.

The newest versions of the policies include additional improvements. Benefits are now available for care provided in alternatives to nursing homes such as assisted living facilities. But all known policies still use the old fixed-benefit concept, with benefit amounts crudely based on where the care is provided, and for home health care, sometimes on the type of care provided. The inventors herein have observed a general lack of appreciation by the insurance industry of the problems that can be caused by basing benefits on the widely varying actual costs of providing care to patients with very different, specific health conditions; such problems can include financial and emotional harm, particularly for people recovering after a hospitalization.

Home health care frequently costs more than nursing home care; it is one-on-one care whereas nursing home care is shared among many patients. This is particularly true for patients recovering from more severe health conditions. For example, if a patient requires 24-hour-a-day nursing care during the first days of recovery, home health care typically costs $30 an hour ($720 a day). But, very few of today's policies include benefit amounts greater than $150 to $200 a day. Yet, most policies with home health care benefits are sold to seniors with a strongly implied promise that they will keep people out of a nursing home. Thus, seniors who count on their policies to keep them at home often find themselves recovering in nursing homes, unless they spend their hard-earned savings to pay for expenses they thought would be covered by their policies.

Today's fixed-benefit long-term care policies provide an inequitable distribution of benefit amounts in that they can pay some patients (i.e., the stereotypical patients who require only maintenance or custodial care) more than the cost of their care, while depriving higher benefit amounts from recovering patients for whom the cost of care often is much greater. Thus, recuperating patients often must spend assets which would otherwise allow them to maintain their standards of living. On the other hand, stereotypical patients do not necessarily profit from excess benefit amounts; indeed, they can suffer emotional harm as a result.

Excessive benefit amounts for nursing home care and often inadequate benefit amounts for home health care encourage some families to put stereotypical patients into nursing homes prematurely (sometimes referred to as "patient dumping"), thereby relieving the families of some of their own financial and emotional burdens. Excessive benefit amounts also encourage some nursing homes to discriminate against higher-cost recovering patients by denying them admittance, preferring instead to admit lower-cost custodial care patients, especially those covered by private insurance, thereby facilitating patient-dumping.

Because of Medicare's and Medicaid's continuing budget constraints, long-term care providers usually operate under constant financial pressures. All too often, cash-strapped nursing homes and unethical home health care providers perform additional unneeded, low-cost, but high-profit services in order to increase their billings up to the maximum benefit amount available to a patient. Some insurance companies attempt to discourage this billing abuse by paying only actual expenses, up to maximum benefit amount limits. However, preventing billing abuse means that they must hire more experienced and more expensive claims personnel to investigate claims much more thoroughly. Thus, savings arising from the prevention of billing abuse can easily be spent on higher claims administration expenses.

One of Medicare's key requirements for skilled nursing facility (i.e., a kind of nursing home) benefits is that a patient must be confined to a hospital for at least 3 days prior to going into a nursing home. Because of continuing cutbacks in Medicare, an ever-increasing number of patients are being discharged before meeting that requirement even though they require skilled medical care to recover. For example, many seniors who undergo major joint reconstructive surgery, including total hip and knee replacements, are being discharged after only two days even though they still need skilled medical care such as nurses to change bandages and give shots of antibiotics to prevent infection, physical therapists, etc. If they want to recover at home, they also need assistance with bathing, dressing, meal preparation, laundry, housekeeping and other daily chores.

With today's long-term care policies focusing on the situs of the care, these recovering patients have two choices. First, if they go into a nursing home, Medicare provides no benefits and their long-term care insurance policies will probably not cover all of their expenses; the fixed-benefit concept did not contemplate recovering patients for whom costs are higher than the routine custodial and maintenance costs charged for the stereotypical nursing home patient. Thus, recuperating patients must spend more of their hard-earned savings for nursing home care, much of which would have been covered by Medicare were it not for Medicare's financial pressures on hospitals causing them to release patients "quicker and sicker." Second, if the patients want to recover at home, they must rely on a combination of their long-term care insurance policies, Medicare, and their own personal savings to pay for their care. While Medicare does pay for 100% of the home health care required by some patients, Medicare on average pays only 41% of all billed home health care expenses. Because home health aides charge $9 an hour or more, often with a 4-hour minimum billing, an insurance policy with home health care benefits can be inadequate to meet a patient's needs, particularly if highly-skilled care (nurses or therapists) is also needed. As a result, the patient, or the patient's family, must somehow make up the difference.

To save money, friends and family members often provide non-medical assistance during a patient's recovery. This costs caregivers tens of millions of dollars in lost wages each year. And, a recent study found that 31% of the families of seriously-ill patients spent most or all of their life savings on the unreimbursed costs of home health care. Medicare provides no benefits for maintenance or custodial care at home or in a nursing home. Thus, people who have developed cognitive impairment (Alzheimer's Disease or senile dementia), or lost the ability to perform some of the normal activities of daily living without the assistance of another person must rely upon friends and family, their savings and their long-term care insurance policies to provide and pay for the care they need. These conditions are degenerative; that is, as time passes, patients need ever-increasing care. Once their benefit amount maximums have been reached, today's fixed-benefit insurance policies force patients to spend their life savings more and more rapidly until they eventually become impoverished and qualify for Medicaid. As a result, patients' spouses and their families often suffer a steadily-decreasing standard of living as their assets diminish. In many cases, especially when home health care is no longer affordable, this results in premature confinement in a Medicaid nursing home, with the concurrent loss of independence for the patient, an emotionally devastating event.

Finally, the high cost of today's policies discourages people from purchasing this vitally important protection. It is very difficult for a 72-year-old to justify paying $150 a month for a policy that provides a benefit amount of only $100 a day for a maximum of only 2 years. The perceived imbalance between benefits and premiums causes adverse selection for an insurance company. That is, the healthiest people tend not to buy the policies, and of those who do become insured, healthier people tend to lapse their coverage more frequently than people who are likely to become sick. To combat the effects of adverse selection, premiums have to be kept high. This results in what seems to be a circular trap for insurance companies, and causes significant numbers of seniors to be without proper insurance protection when their need arises.

The failure to appreciate the problem and business-as-usual momentum of the insurance industry has resulted in little or no effort to even attempt to solve the true underlying problem. The state of the art is represented in an article published in the Chicago Sun Times, on Dec. 21, 1994, by Spencer Rich, titled "Ill Relatives Cost Families Life Savings", reporting on a study of 2,661 adult patients released from five medical centers. (See also Journal of American Medical Association "The Impact of Serious Illness on Patients' Families" Covinsky et. al, Dec. 21, 1994.) "All told, 31% [of the families of seriously ill patients] used up all or most of their life savings on the unreimbursed cost of home care, health aides, special transportation and related medical costs." Two years later, essentially the same conclusion was expressed in an article in the May 1996 Best's Review Life/Health Ed. by Ron Panko, who cited Steven Devlin, Ph. D. Associate Director of the Boettner Center of Financial Gerontology at the Univ. of Pa., reporting on a study of 5,800 families nationwide showing that in the last six months of their parents' lives, 31% of the families spent all of their life savings on their parents. "That's frightening for families," he says. "You may be 70 and your mother is 90, and you are spending all of your money caring for her."

For too long, it has been a business as usual approach, with patients and their friends and families suffering devastating losses.

III. SUMMARY OF THE INVENTION

A. OBJECTS AND ADVANTAGES

In view of the foregoing, the inventors herein have made a first innovation in the field of insurance that has created a need for a second innovation in the field of computer science, the latter being the subject of this patent application. Thus, an object of the invention for which a patent is sought is overcoming some or all of the drawbacks listed above by computerized apparatus and methods.

It is a further object of the present invention to provide an apparatus and method for efficiently producing (and distributing) an insurance product having a more equitable arrangement of benefit amounts for patients requiring long-term care by providing benefit amounts that vary by patient category, such that over the prior art fixed-benefit arrangement approach: (1) for patients with less severe health conditions, particularly those who require only lower-cost maintenance and custodial care, lower benefit amounts reduce the potential for billing abuses by care providers without reducing the quality of care, and (2) for patients who have more severe health conditions and who require more expensive care as a result, higher benefit amounts to reduce the financial burden on patients and their families than could arise with current fixed-benefit plans.

It is a further object of this invention to provide automated apparatus for mass production of the insurance product to provide stereotypical long-term care patients (i.e., those with degenerative medical conditions such as Alzheimer's Disease, senility dementia, and the gradual loss of the ability to perform normal activities of daily living) with a readily available arrangement of benefit amounts based on the relative severity of their health conditions, and regardless of where they receive long-term care, such that over the prior art fixed-benefit arrangements, benefit amounts can be gradually increased over time as patients' health conditions deteriorate and their needs for progressively more intensive and more expensive care increases, once again reducing the financial burden that could arise with current fixed-benefit arrangements.

It is a further object of this invention to provide computerized efficiency and cost reduction in distribution of the product to provide, on a large scale, stereotypical long-term care patients with the financial means which will allow them to remain in their homes for a longer period of time, thereby retaining their sense of independence for as long as possible. That is, unlike prior art fixed-benefit plans, the automated approach of the present invention involves benefit amounts that can be gradually increased as a patient's health condition deteriorates, which reduces the likelihood of premature confinement in a nursing home that could otherwise result from a combination of inadequate home health care benefit amounts under fixed-benefit plans, and depletion of a patient's financial resources.

It is a further object of this invention to provide computerized apparatus and methods for providing higher benefit amounts for home health care for patients with more severe health conditions. The advantage is that after being discharged from a hospital, more patients will be able to recover at home—where they want to be—rather than in a nursing home. Therefore, this invention fulfills the goal of keeping patients out of nursing homes better than current fixed-benefit arrangements.

It is a further object of this invention to produce, by computer, a more equitable arrangement of benefit amounts which: (1) by providing lower benefit amounts for stereotypical long-term care patients, becomes a strong financial disincentive for their families who may otherwise dump their relatives into nursing homes before their health condition requires such confinement; and (2) by providing higher benefit amounts to higher-cost recovering patients, helps eliminate discrimination by nursing homes which, under fixed-benefit plans, prefer to admit only lower-cost patients.

It is a further object of this invention to provide, by computer, higher benefit amounts for nursing home care for patients with more severe health conditions, but who do not meet the 3-day minimum hospital-stay requirement to qualify for Medicare's Skilled Nursing Facility benefit. The advantage over a fixed-benefit arrangements is that these patients will have potentially larger insurance benefits to help pay for their confinement than under conventional, prior art fixed-benefit plans. Therefore, this invention can reduce a patient's, or their family's, out-of-pocket expenses—on a large scale.

It is a further object of this invention to help, by computer, recovering patients and healthy spouses of stereotypical long-term care patients to retain their standards of living by reducing or avoiding a drain on their income-producing assets. The advantage over conventional long-term care fixed-benefit arrangements is that benefit amounts are more closely matched to the actual costs of providing care for a patient. Because the benefit amounts are higher when costs are higher, patients and their families will spend less outof-pocket than under fixed-benefit plans. This helps patients and their families avoid the sometimes humiliating experience of spending down their assets so far that they must rely on Medicaid for all further financial assistance; if this were to occur, the healthy spouses and recovered patients could be destitute for the rest of their lives, with little or no hope for financial recovery.

It is a further object of this invention to provide a computerized approach to an arrangement of benefit amounts which is more attractive to prospective purchasers due to the potentially higher benefit amounts than current fixed-benefit arrangements, such that more people would be expected to purchase this type of long-term care insurance and more insurance companies will benefit from reduced adverse selection, both at the time of application and during the continued lifetime of the plans. Additionally, because of the lower adverse selection, premiums can be reduced and made more affordable, thereby further increasing the attractiveness of the plans and their rate of sales. Finally, since more people will be covered by these plans when their need arises, fewer patients and their families will suffer the often devastating financial consequences of long-term care.

Further objects and advantages of this invention will become apparent from a consideration of the figures and ensuing description.

B. SUMMARY OF THE INVENTION

This invention is an improved computer apparatus and method for calculating a more equitable arrangement of benefit amounts for long-term care patients by providing benefit amounts that vary according to patient categories based on common characteristics such as, but not limited to: the cost of patient care, the type of care provided, the relative severity of patients' health conditions, or a combination thereof. This results in benefit payments that are more closely related to the cost of providing their care. The product of this invention is a schedule of benefit amounts in which a distinct benefit amount is calculated or determined for each defined patient category. The benefit amounts are inserted in pre-formatted documentation such as a policy or policy schedule.

The invention includes a method for using a digital electrical apparatus to electrically process signals in generating output for insurance documentation, the method including the steps of: in a digital electrical computer apparatus comprising a digital computer having a processor, the processor electrically connected to a memory device for storing and retrieving operations including machine-readable signals in the memory device, to an input device for receiving input data and converting the input data into input electrical data, to a visual output device for converting output electrical data into output having a visual presentation, to a printer for converting the output electrical data into printed documentation, wherein the processor is programmed to control the apparatus to receive the input data and to produce the output data by steps including: defining a plurality of patient categories; and for each of said categories, determining a periodic duration-specific insurance benefit amount for long-term care patients; the method further comprising the step of inserting said periodic duration-specific insurance benefit amounts in a long-term care insurance policy.

More particularly, in this method, the step of determining includes: associating a value with each said category; and applying a filter to each said value such that the amounts are scaled solely by the filter. Further, the step of inserting can be carried out by the apparatus such that the policy is a portion of the documentation corresponding to the machine readable signals in the memory device. The method preferably comprises, in the step of defining, specifying medical, physical, psychological, or other conditions (or combination thereof) for each said category. It is particularly preferable to have the step of determining carried out to reflect a patient cost for receiving long-term care in a setting other than either a nursing home or nursing facility, the cost being obtained from input data.

The apparatus corresponding to the foregoing method, as well as the method of making the apparatus to carry out the foregoing method are also contemplated as the invention. Additionally, the memory media containing a computer program, and the data corresponding to insurance documentation, are viewed as being part of the invention, along with product produced by the invention.

Even more particularly, the present invention involves an improved method and apparatus for determining periodic duration-specific insurance benefit amounts and/or benefit limits for long-term care patients, wherein the improvement includes the steps of:

a. defining a set of patient categories based on common patient characteristics;

b. a computer means for sorting and summarizing long-term care patient data according to said patient categories;

c. if suitable values have not been determined or assigned as a result of the above sorting and summarizing step, the computer means for determining or modifying an assigned value, based on the cost of patient care, severity of medical or health conditions, or a combination thereof, for each of said patient categories;

d. for said patient categories and said values, performing a filtering operation, including selecting an appropriate filter;

e. defining or determining the benefit amount for each said patient category; and g. generating insurance documentation, preferably automatically by the computer means, the documentation including an insertion of all the benefit amounts in a policy or policy schedule preformated to receive the benefit amounts.

IV. DETAILED DESCRIPTION OF A PREFERRED EMBODIMENT

As a prefatory note, attention is drawn to the unique language of today's health care environment: (1) 72% of the seniors sent to nursing homes stay for less than 90 days, and (2) 83% of Medicare's home health care cases also last for less than 90 days, but the insurance industry and its governmental regulators consider these patients to be "long-term care" patients. While they are actually short-term recovering patients, the present specification has adopted the industry's nomenclature throughout the description of this invention. Thus, this invention not only applies to stereotypical long-term care patients who are unable to take care of themselves because of chronic cognitive or physical impairment, but it also applies to short-term recovering patients.

Most references in the description of this invention are to people age 65 and older (seniors); however, long-term care is also needed by younger people, but less frequently. Therefore, this invention applies to people of all ages.

The patient-categorizing models referred to later in the description of this invention have been developed by examining nursing home patients; however, the models can also be used with equal validity to derive category-based benefit amounts for care provided in settings other than nursing homes since the models are based on patients' health conditions which are independent of where care is provided. Whenever the terms "health condition" or "health conditions" are used in this invention, they include patients' medical, physical, and mental conditions.

References to insurance companies, companies, and insurers in this description include Blue Cross and Blue Shield organizations, health maintenance organizations (HMOs), employer self-insured programs, and all other insurance arrangements, except the federal or state Medicare and Medicaid programs and their successors. References to insurance, policy, or policies include any program or plan under which benefits are provided, or that pays for, long-term care, nursing home care, home health care, or any other similar type of care, except the federal or state Medicare and Medicaid programs and their successors.

References to "benefit amount" or "benefit amounts" in this invention mean a specific dollar amount(s) for which an eligible long-term care patient can qualify irrespective of the cost of the patient's long-term care. References to "benefit limit" or "benefit limits" in this invention shall mean a specific maximum dollar amount(s) for which an eligible long-term care patient can qualify based on the cost(s) incurred for the patient's long-term care.

This invention applies to long-term care benefit arrangements in which periodic benefit amounts or benefit limits are duration-specific such as, but not limited to, daily, weekly, monthly or any other appropriate frequency, and that said duration-specific frequency is not necessarily associated with the frequency of actual benefit payments, nor to the maximum benefit period during which such benefit payments can be made.

Whenever the terms "benefit amount" or "benefit amounts" are used in this invention, they include the terms "benefit limit" or "benefit limits" unless the terms "benefit limit" or "benefit limits" are used separately.

Figure 1:
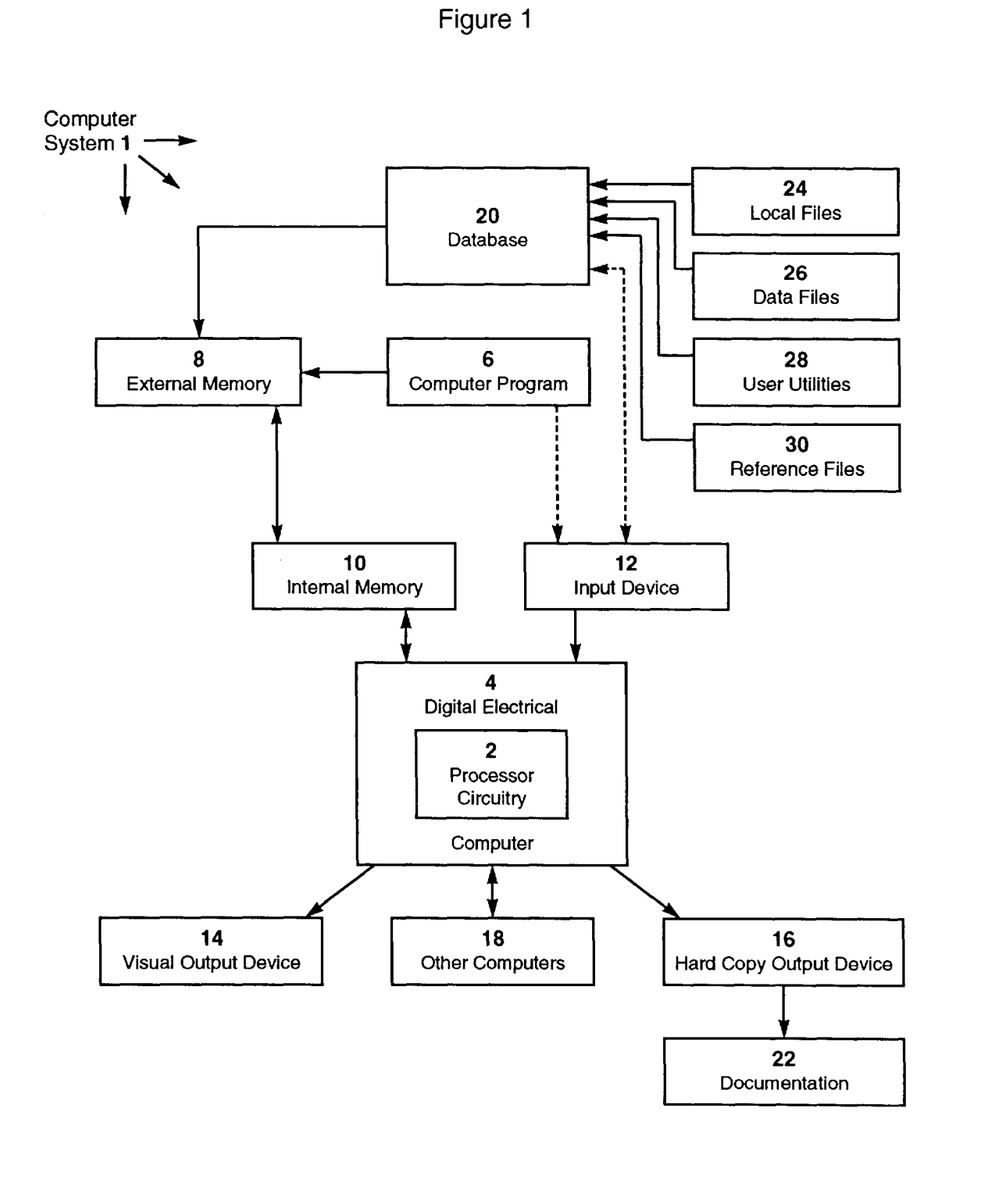
FIG. 1 is a representation of an apparatus in accordance with the present invention.

FIG. 1 shows, in block diagram form, the computer-based elements which can be utilized to implement the present invention. The present invention involves computer system 1, which includes processor circuitry 2 in a digital electrical computer 4. For flexibility, it is preferable to have the processor circuitry 2 formed by means of a computer program programming programmable circuitry, i.e., programming the computer (processor). The programming can be carried out with a computer program (or programs) 6, which for flexibility should be in the form of software stored in an external memory 8, such as a diskette, hard disk, virtual disk, or the like. (The virtual disk is actually an extended internal memory 10 which may assist in speeding up computing.) A diskette approach is optional, but it does provide a useful facility for inputting or storing data or the host software. Of course storing the computer program 8 in a software medium is optional because the same result can be obtained by replacing the software in a software medium with a hardware storage device, e.g., by burning the computer program 8 into a ROM.

An internal memory 10 works in cooperation with the external memory 8. An input device 12 could be a keyboard or equivalent means for a user to input the data discussed below. A visual display unit 14 can be employed for a visual representation, and a printer 16 can be employed for producing hard copy output 22. Note that output electrical data can also be stored to memory 8.

For such an embodiment, the following specification should operate satisfactorily: an IBM or compatible PC (type XT or upwards) computer with a 386 or higher processor, having at least 640 kb of memory (RAM). The environment/operating system could be MS-DOS/PC-DOS for equivalent) version 3.0 or later. A numeric (math) co-processor is also advantageous in speeding up computing times, as is an extended memory. Alternatively, a Windows implementation could be used. The input device 12 can be any ANSI standard terminal, and the visual display unit 14 can be a Trinatron color monitor.

Still other alternatives include using a network of other computers 18 or a mini-computer or mainframe system. With such larger scale approaches, the external memory 8 could be a tape or a CD ROM for data retrieval. A VAX or Microvax system running VMS 5.0 or later is an acceptable approach.

As indicated above, an embodiment could also be carried out in hardware, though this is not recommended as it is an inflexible approach. Accordingly, a hardware implementation is described here for exemplary purposes. Of course it is well known that a computer program can be stored in hardware by many approaches, not the least of which is burning it into a ROM. More sophisticated than burning a ROM, but also entirely conventional, is to use techniques to translate the computer program 6 into an ASIC or a chip that will carry out the invention in an equivalent manner, and in fact with equivalent circuitry to that formed by programming programmable computer circuitry. It is all just digital electrical circuitry processing digital electrical signals, transforming them to output different electrical signals.

The present invention can best be implemented by utilizing a database 20 of files (or an equivalent, e.g., records, a relational database, etc.) pertaining to insurance documentation data for processing as discussed herein. In FIG. 1, respective dotted lines between database 20 and input device 12, and between computer program 6 and input device 12 illustrate that the computer program 6 and contents of database 20 can be obtained from data input at the input device 12, which converts the respective input data into respective electrical signals for handling by the digital electrical computer 4, and processor 2, including storing the respective digital electrical signals in the memories 8 and 10. Output electrical data, in the form of digital electrical signals, is generated by the processor 2 processing the input electrical data in a manner specified by the executable program 6, such that when operated, the system 1 as a whole produces a tangible presentation, such as that represented in FIG. 1 as documentation 22, including such documents as insurance and illustration documentation. The documentation preferably is preformatted so that computed benefit amounts can be inserted, preferably automatically rather than by hand.

There can be five basic types of file or data stored in the external memory 8:

1. The main program file (i.e., computer program 6).
2. Local files 24 (files specific to a particular user and not available to other users). These include files describing the configuration of the user's preferred output format, private dictionary files, input and output files generated by the user, etc.

3. Data files 26 local to a user, which in a single computer system, would include the main database file.
4. User utilities 28, which assist in customizing reference files and in the creation of private dictionaries.
5. Reference files 30, which are accessible to all users (e.g., users of other computers 18) and include the standard (or 'public') dictionary files, files containing the menus, error and information messages and prompts. Of course if the invention is carried out with one computer and used by one user, reference files 30 are kept along with local files 24.

In any case, a user should have access to the files that include the above-referenced insurance documentation. Further detail in regard to the other files is disclosed in the appendix which is incorporated by reference into this specification.

The programmed processor circuitry 2 uses the contents of files 24–30 which represents some or all of the data input by the user to produce output data in a digital electrical form of a string of bits which correspond to processed data. The processor circuitry 2 carries out its operations by using at least one "filter", which can be characterized as an analysis or process restricted by a precise definition. Elements of the definition can be characterized by at least one logical operator or operand to indicate the precise definition or process to be carried out, e.g., whether the union or intersection of two elements or the complement of an element is required. The term "filter" is also applied to the process of applying this definition to change, create, or generate, or exclude data other than that defined from subsequent processing.

This invention can also be implemented by utilizing at least one pointer to insert a computed piece of data into the preformatted text of the above-referenced documentation in the appropriate data file(s). Alternatively, a plurality of pointers can be logically linked so that the output electrical data can be inserted in a plurality of locations in the aforementioned insurance documentation 22. The computer program 6 controlling the digital electrical computer 4 checks for the pointer(s) to ascertain whether any electrical output data should be inserted in generating the insurance documentation 22. This is preferable to an approach of doing the computing to define the benefit amounts and then manually entering the computed benefit amounts on printed insurance documentation preformatted to accommodate the inserted amounts.

Figure 2:
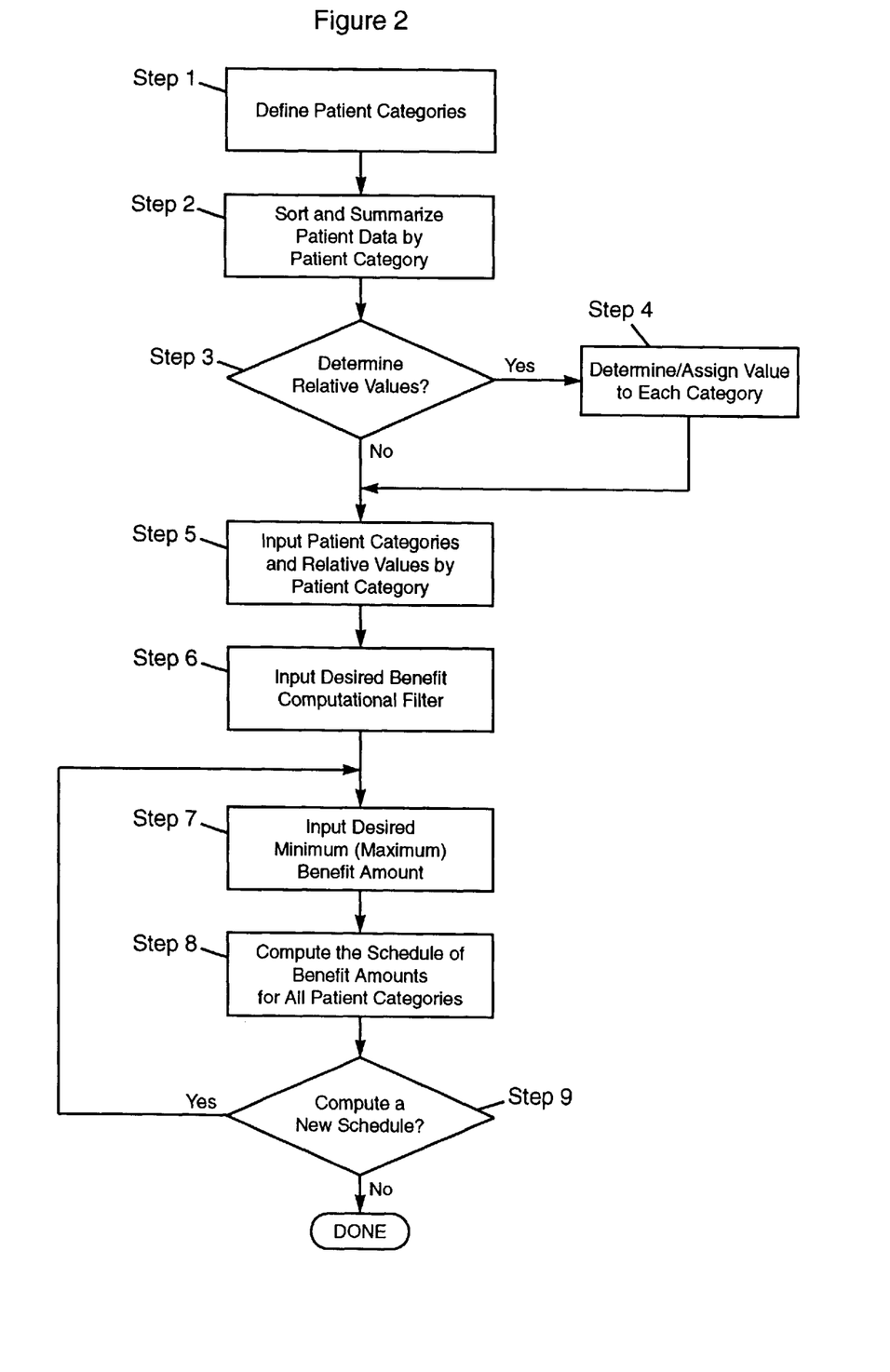
FIG. 2 is a flowchart representing the method carried out by the apparatus, the method involving determining a plurality of benefit amounts based on categories or groupings of patients with certain common characteristics.

Turning now to FIG. 2, there are 9 steps involved in the development of a schedule of category-based benefit amounts for long-term care patients.

Step 1. Define the patient categories with the computer apparatus.

Step 2. Sort and summarize the patient data by category defined in Step 1 with the computer apparatus.

Step 3 is a decision point. Is it necessary to determine or modify an assigned relative value for each category? If the answer is "Yes," go to Step 4. If the answer is "No" because an appropriate scale of relative values has already been established for the categories, proceed to Step 5.

Step 4. Determine or modify an assigned relative value for each category defined in Step 1 based on the patient data sorted and summarized in Step 2.

Step 5. Input the patient categories and corresponding relative values into a data processing system program that has the capability of performing arithmetic functions (addition, subtraction, multiplication and division) across columns and rows.

Step 6. It is recommended that an insurer select one of the following two filters for input the processing described in Step 5 above. To determine which filter is appropriate, the insurer must first decide whether the resultant schedule of benefit amounts is to be based on: (1) the maximum benefit amount for the patient category with the highest relative value, or (2) the minimum benefit amount for the patient category with the lowest relative value.

The two filters and their respective components can be characterized as follows:

Filter 1

Based on computing the schedule of benefit amounts based on the maximum benefit amount to be made available:

| | | |
|---|---|---|
| A | = | Relative value of the category for which the benefit amount is to be computed. |
| B | = | Highest relative value of all categories. |
| C | = | Maximum benefit amount. |

Benefit Amount for the Category=(A/B)×C

Filter 2

Based on computing the schedule of benefit amounts based on the minimum benefit amount to be made available:

| | | |
|---|---|---|
| D | = | Relative value of the categoy for which the benefit amount is to be computed. |
| E | = | Lowest relative value of all categories. |
| F | = | Minimum benefit amount. |

Benefit Amount for the Category=(D/E)×F

Step 7. Input the desired maximum or minimum benefit amount to be used to compute the schedule of benefit amounts.

Step 8. Compute all benefits and, if desired, generate a printout of the schedule of benefit amounts per patient category.

Step 9 is a decision point. If the insurer wishes to compute another schedule of benefit amounts, return to Step 7 and input a different maximum or minimum benefit amount, depending on the filter selected. If not, the insurer has computed the schedule of benefit amounts. (NOTE: After this step, other actuarial assumptions and activities are involved in the development of premium rates for an insurance plan based on this (these) schedule(s) of benefits. However, those assumptions and activities are not part of this invention.) At this point, the insurance documentation 22 can be created or generated.

To demonstrate the operation of this invention, the RUG-III nursing home patient-categorizing model has been selected (and modified) because it is available and it most accurately reflects the costs of providing care to long-term care patients. However, other patient-categorizing models may also be used to produce schedules of nursing home, home health care and/or related insurance benefit amounts based on categories of long-term care patients with common characteristics.

More particularly, several methods have been developed for categorizing patients with common characteristics by the relative severity of their medical conditions. (Alternatively, an insurer could develop its own method by utilizing its own resources.) One such method, Resource Utilization Groups (RUGs), was co-developed by Brant E. Fries, Ph. D, Institute of Gerontology, University of Michigan, and his colleagues.

In 1987, Dr. Fries offered to assist the insurance industry with the application of RUGs to the development of new long-term care insurance policies. The offer was made to the Health Insurance Association of America, a trade group in which most health insurers were and continue to be members. Nothing resulted from these discussions; Dr. Fries did not pursue the matter with any individual companies. But, if a company had wished to evaluate the application of RUGs or other patient-categorizing methods to its policies, numerous articles have appeared since at least 1985 in publications such as Medical Care, The Gerontologist, and Health Care Financing Review, published quarterly by the Health Care Financing Administration (HCFA), U.S. Department of Health and Human Services, the federal agency that administers Medicare.

RUGs and other patient-categorizing models were developed to help the federal and state governments in their efforts to control costs while, at the same time, providing better care for nursing home patients under the Medicare and Medicaid programs. Prior to the development of RUGs, most states reimbursed nursing homes for the actual cost of providing care to Medicaid patients, up to a maximum daily limit per patient. This approach encouraged many cash-strapped nursing homes to fill their beds with the least expensive types of patients, i.e., the stereotypical patients who required only low-cost maintenance and custodial care, and then perform additional low-cost but high-profit services in order to bill the government at the maximum daily reimbursement limit. Thus, nursing homes had a strong disincentive to admit patients who required higher-intensity care.

Versions of RUG-II were introduced in the mid-1980s, largely as demonstration projects, in several states with the goals of matching Medicaid payments with intensity of nursing home care, assuring placement of patients in the appropriate level of care and encouraging restorative care. All of the goals were achieved. Based on the knowledge gained, the RUGs concept was improved and reintroduced in 1990 as RUG-III in an ongoing multi-state demonstration project for Medicaid nursing home patients, and has been modified by HCFA for a demonstration project for Medicare's skilled nursing facility patients.

One approach to implementing an embodiment of the present invention involves the idea of expanding and tailoring the application of nursing home patient-categorizing models to apply other settings in which long-term care is provided including, but not limited to: patients' homes, adult day care or other community facilities, continuing care retirement communities, and/or assisted living facilities, such that more long-term care patients will be able to receive benefit payments which are more closely related to their health conditions and to the cost of their care than under fixed-benefit arrangements.

Step 1. Define Patient Categories

RUG-III includes seven principal patient categories that, through further secondary and tertiary splits, produces a total of 44 patient categories. Many of these splits are defined by the RUG-III ADL (Activities of Daily Living) Index. The seven principal patient categories are defined in Table 1 below:

TABLE 1

1. Rehabilitation (Special). Rehabilitation therapy is any combination of physical, occupational, or speech therapy. This category is divided into 4 sub-categories defined by the intensity of care provided to patients, as follows:

Very High Intensity Multidisciplinary Rehabilitation. 450+ minutes of rehabilitation therapy per week, 2+ of the three therapies provided, with 5+ days per week of one type of therapy.

High Intensity Rehabilitation. 300+ minutes of rehabilitation therapy per week, with 5+ days per week of one type of therapy.

Medium Intensity Rehabilitation. 150+ minutes of rehabilitation therapy per week, with 5+ days per week of one type of therapy.

Low Intensity Rehabilitation. 45+ minutes of rehabilitation therapy per week, with 3+ days per week of therapy, and 2+ types of nursing rehabilitation.

2. Extensive Services. Patients who have a RUG-III ADL Index score of at least 7 and who meet at least one of the following criteria: parenteral feeding, suctioning, tracheostomy, ventilator/respirator.

3. Special Care. Patients who have a RUG-III ADL Index score of at least 7 and at least one of the following: burns, coma, fever (with vomiting, weight loss, pneumonia, or dehydration), multiple sclerosis, pressure ulcers (stage 3 or 4), quadriplegia, septicemia, IV medications, radiation treatment, tube feeding.

4. Clinically Complex. Patients who meet at least one of the following criteria: aphasia, aspirations, cerebral palsy, dehydration, hemiplegia, internal bleeding, pneumonia, stasis ulcer, terminal illness, urinary tract infection, chemotherapy, dialysis, 4+ physician visits per month, respiratory or oxygen therapy, transfusions, wound care other than pressure ulcer care (including active foot care dressings); or patients meeting the criteria for the Extensive Services or Special Care categories but with RUG-III Index scores of 4–6.

5. Impaired Cognition. Patients with a RUG-III ADL Index score of 4 to 10 who have cognitive impairment in all three of the following dimensions: decision-making (not independent), orientation (any problem recalling current season, location of own room, staff names or faces, that he/she is in a nursing home, etc.), short-term memory.

6. Behavior Problems. Patients with a RUG-III ADL Index score of 4 to 10 who display daily problems with: inappropriate behavior, physical abuse, verbal abuse, wandering; or with hallucinations.

7. Physical Functions (Reduced). Patients who do not meet the conditions of any of the earlier categories, including those who would meet the criteria for the Impaired Cognition or Behavior Problems categories but have a RUG-III ADL Index score of 11 or more.

Six primary activities of daily living (ADLs) are typically used to determine patients' need for long-term care: eating, toileting, transferring, bathing, dressing and continence. However, RUGs researchers found that only 3 plus a newly created ADL (bed mobility) are the only statistically significant predictors of the cost of long-term care. Thus, the RUG-III ADL Index is based on a patient's ability to perform each of these four ADLs, as described in Table 2 below. The patient's ADL Index is the sum of the scores for all four categories.

TABLE 2

ADLs and Categories of Functional Capability Score

| | | |
|---|---|---|
| 1. | Bed Mobility: | |
| | a. Independent or supervision | 1 |
| | b. Limited assistance | 3 |
| | c. Extensive assistance or total dependence, requires only one person for physical assistance | 4 |
| | d. Extensive assistance or total dependence, requires two or more persons for physical assistance | 5 |
| 2. | Transferring: | |
| | a. Independent or supervision | 1 |
| | b. Limited assistance | 3 |
| | c. Extensive assistance or total dependence, requires only one person for physical assistance | 4 |
| | d. Extensive assistance or total dependence, requires two or more persons for physical assistance | 5 |

TABLE 2-continued

ADLs and Categories of Functional Capability Score

3. Toileting:
   a. Independent or supervision ... 1
   b. Limited assistance ... 3
   c. Extensive assistance or total dependence, requires only one person for physical assistance ... 4
   d. Extensive assistance or total dependence, requires two or more persons for physical assistance ... 5
4. Eating:
   a. Independent or supervision ... 1
   b. Limited assistance ... 2
   c. Extensive assistance or total dependence (including feeding tubes or parenteral feeding) ... 3

Other variables are also used to create the 44 RUG-III patient categories. These are described in Table 3 below.

TABLE 3

Extensive Treatment Count

A count of the following extensive treatments (Extensive Services category): parenteral feeding, suctioning, tracheostomy, ventilator/respirator.

TABLE 3-continued

Depressed Mood (Sad)

Signs and symptoms of a depressed state or sad mood (tertiary split for the Clinically Complex category). This is a defined as a persistent sad or anxious mood together with at least 2 of the following symptoms.
a. Expressions of distress.
b. Agitation or withdrawal.
c. Early awakening with unpleasant mood or awake only 7 hours per day.
d. Thoughts of death or suicidal thoughts.
e. Weight loss.

Nursing Rehabilitation

Nursing rehabilitation activities are used as a tertiary split for the Impaired Cognition, Behavior Problems, and (Reduced) Physical Functions categories and as a criteria for the Low Intensity Rehabilitation category if at least two of the following activities occur five or more days per week: amputation care, active range of motion, passive range of motion, splint/-brace assistance, dressing/grooming training, eating/swallowing training, locomotion/mobility training, transfer training, and except for the Low Intensity Rehabilitation category, any toileting program.

Applying the RUG-III ADL Index described in Table 2 and the variables described in Table 3 subdivides RUG-III's seven principal patient categories into the 44 categories shown in Table 4 below.

TABLE 4

RUG-III Categories, Prevalence, and Variable Cost Indices

| RUG-III Category | Category Code | ADL Range | Tertiary Split | Prevalence | Variable Cost Index |
|---|---|---|---|---|---|
| All Categories | | 4–18 | | 100.0% | 1.00 |
| Rehabilitation (Special) | | | | 7.2% | 2.28 |
| Very High Intensity | RVC | 14–18 | | 0.5% | 3.68 |
| Very High Intensity | RVB | 8–13 | | 1.0% | 3.01 |
| Very High Intensity | RVA | 4–7 | | 0.3% | 2.65 |
| High Intensity | RHD | 15–18 | | 0.3% | 2.83 |
| High Intensity | RHC | 12–14 | | 0.7% | 2.47 |
| High Intensity | RHB | 8–11 | | 0.7% | 2.29 |
| High Intensity | RHA | 4–7 | | 0.3% | 2.14 |
| Medium Intensity | RMC | 16–18 | | 0.2% | 2.52 |
| Medium Intensity | RMB | 8–15 | | 1.8% | 1.95 |
| Medium Intensity | RMA | 4–7 | | 0.2% | 1.74 |
| Low Intensity | RLB | 12–18 | | 0.8% | 1.52 |
| Low Intensity | RLA | 4–11 | | 0.5% | 1.31 |
| Extensive Services | | | | 2.1% | 1.97 |
| Extensive | SE3 | 7–18 | 3 Services | 0.2% | 3.61 |
| Extensive | SE2 | 7–18 | 2 Services | 0.5% | 2.44 |
| Extensive | SEI | 7–18 | 1 Service | 1.4% | 1.62 |
| Special Care | | | | 10.0% | 1.36 |
| Special | SSC | 17–18 | | 4.0% | 1.45 |
| Special | SSB | 14–16 | | 4.9% | 1.33 |
| Special | SSA | 7–13 | | 1.2% | 1.18 |
| Clinically Complex | | | | 31.4% | 0.98 |
| Complex D | CD2 | 17–18 | Depressed | 0.7% | 1.34 |
| Complex | CD1 | 17–18 | Not Depressed | 3.7% | 1.24 |
| Complex D | CC2 | 11–16 | Depressed | 2.7% | 1.11 |
| Complex | CC1 | 11–16 | Not Depressed | 11.4% | 1.06 |
| Complex D | CB2 | 6–10 | Depressed | 1.2% | 1.02 |
| Complex | CB1 | 6–10 | Not Depressed | 5.1% | 0.89 |
| Complex D | CA2 | 4–5 | Depressed | 0.9% | 0.73 |
| Complex | CA1 | 4–5 | Not Depressed | 5.6% | 0.65 |
| Impaired Cognition | | | | 10.1% | 0.62 |
| Impaired N | IB2 | 6–10 | Nursing Rehab | 1.7% | 0.80 |
| Impaired | IB1 | 6–10 | No Nursing Rehab | 3.6% | 0.73 |

TABLE 4-continued

RUG-III Categories, Prevalence, and Variable Cost Indices

| RUG-III Category | Category Code | ADL Range | Tertiary Split | Prevalence | Variable Cost Index |
|---|---|---|---|---|---|
| Impaired N | IA2 | 4–5 | Nursing Rehab | 0.7% | 0.56 |
| Impaired | IA1 | 4–5 | No Nursing Rehab | 4.1% | 0.46 |
| Behavior Problems | | | | 1.6% | 0.54 |
| Behavior N | BB2 | 6–10 | Nursing Rehab | 0.2% | 0.79 |
| Behavior | BB1 | 6–10 | No Nursing Rehab | 0.4% | 0.72 |
| Behavior N | BA2 | 4–5 | Nursing Rehab | 0.1% | 0.53 |
| Behavior | BA1 | 4–5 | No Nursing Rehab | 0.9% | 0.41 |
| Physical Functions (Reduced) | | | | 37.6% | 0.73 |
| Physical N | PE2 | 16–18 | Nursing Rehab | 2.8% | 1.07 |
| Physical | PE1 | 16–18 | No Nursing Rehab | 4.7% | 1.02 |
| Physical N | PD2 | 11–15 | Nursing Rehab | 4.4% | 0.92 |
| Physical | PD1 | 11–15 | No Nursing Rehab | 8.0% | 0.91 |
| Physical N | PC2 | 9–10 | Nursing Rehab | 0.7% | 0.78 |
| Physical | PC1 | 9–10 | No Nursing Rehab | 1.6% | 0.71 |
| Physical N | PB2 | 6–8 | Nursing Rehab | 0.6% | 0.65 |
| Physical | PB1 | 6–8 | No Nursing Rehab | 1.9% | 0.62 |
| Physical N | PA2 | 4–5 | Nursing Rehab | 1.4% | 0.52 |
| Physical | PA1 | 4–5 | No Nursing Rehab | 11.6% | 0.39 |

Some patient-categorizing models include patient categories that have been split into sub-categories to promote more effective patient care, with only small differences in the costs of providing that care. An insurer may wish to simplify its schedule of benefit amounts by consolidating some patient categories and adjusting related data to make it easier for consumers to understand and reduce its claims administration costs. It is believed by the inventors herein that this is the case with RUG-III's 44 categories. RUG-III's primary categories of Impaired Cognition and Behavior Problems are virtually the same in terms of resource utilization. It is also believed that the Nursing Rehabilitation and Depression splits increased accuracy only 0.1% in terms of resource utilization. Therefore, a first consolidated category became Cognitive Impairment and/or Behavior Problems, with no splits for Nursing Rehabilitation. Then, Depression splits were removed from the Clinically Complex category, the Nursing Rehabilitation splits from the Physical Functions (Reduced) category, and Prevalence and Variable Cost Index factors were adjusted. As a result, RUG-III's primary categories were reduced from 7 to 6, and its sub-categories were reduced from 44 to 29.

Furthermore, the 12 sub-categories within the RUG-III Rehabilitation (Special) category are potentially very confusing to consumers and could significantly increase claims administration costs. However, no straightforward method of consolidation seemed to be available. Therefore, this category was redefined as:

Rehabilitation. Patients who receive any combination of physical, occupational or speech therapy at least 15 minutes a day, 5 days a week, with a restorative goal.

Next, the degree of intensity was eliminated because, in terms of computing insurance benefit amounts, the purpose of the degree of intensity could largely be maintained by basing benefit amounts on the ADL Range, i.e., patients with higher ADL Indices tend to require more intensive (and more expensive) rehabilitation services than those with lower ADL Indices.

Finally, the ADL Ranges, Prevalence and Variable Cost Index factors were adjusted to produce 3 easily-understood sub-categories. NOTE: The final adjustments to this category were based on estimates as no detailed patient-by-patient information seemed to be available.

Neither the Extensive Services nor the Special Care categories were revised, as both of these categories were well-defined.

These adjustments further reduced RUG-Ill's subcategories from 29 to 20, as shown in Table 5 below, along with adjusted Prevalence and Variable Cost Index factors.

TABLE 5

Adjusted RUG-III Categories, Prevalence, and Variable Cost Indices

| Adjusted RUG-III Category | ADL Range | Prevalence | Variable Cost Index |
|---|---|---|---|

Step 4. Determine, Assign or Modify Relative Values

Determine or assign a relative value to each category defined in Step 1 based on the patient data sorted and summarized in Step 2. Or, if relative values have already been used, make any needed modifications.

For example, RUG-III uses an indexed scale of relative daily variable costs for which the average patient's cost index is set at 1.00. However, variable costs represent only about 50% of the total cost of providing patient care. The other 50% describes fixed expenses, such as capital, facility management and plant maintenance that vary little by patient category. Thus, two columns were added to the information described in Table 5 above. The first column adds the fixed cost index of 1.00 to each of the 20 patient categories; the second column totals the variable and fixed columns. The result is shown in Table 6 below in Step 8.

Step 5. Input Data

Input the patient categories and corresponding relative values into system 1 for performing filtering across columns and rows. Examples of such programs include, but are not limited to, computer spreadsheet programs and database programs.

Step 6. Input Desired Benefit Computation Filter

While other filters may also be used, one of the following two filters is recommended for input into the data processing system program described in Step 5 above. To determine which filter is appropriate, the insurer must first decide whether the resultant schedule of benefit amounts is to be based on: (1) the maximum benefit amount for the patient category with the highest relative value, (2) the minimum benefit amount for the patient category with the lowest relative value, or (3) some other basis (e.g., average, median, etc.). The first two such filters and their respective components are as follows:

Filter 1

Based on computing the schedule of benefit amounts based on the maximum benefit amount to be made available:

| | | |
|---|---|---|
| A | = | Relative value of the category for which the benefit amount is to be computed. |
| B | = | Highest relative value of all categories. |
| C | = | Maximum benefit amount. |

Benefit Amount for the Category=(A/B)×C

Filter 2

Based on computing the schedule of benefit amounts based on the minimum benefit amount to be made available:

| | | |
|---|---|---|
| D | = | Relative value of the category for which the benefit amount is to be computed. |
| E | = | Lowest relative value of all categories. |
| F | = | Minimum benefit amount. |

Benefit Amount for the Category=(D/E)×F

For the purpose of demonstrating this invention, Filter 2 has been inserted into the right-hand column of Table 6, shown below in Step 8.

Step 7. Input Desired Minimum (Maximum) Benefit Amount

For the purpose of demonstrating this invention, $50 has been selected as the minimum daily benefit amount to appear in the schedule of benefits.

Step 8. Compute Benefit Schedule

System 1 can employ a computer spreadsheet program to perform the computation of benefit amounts, thereby producing the following Schedule of Daily Benefit Amounts.

TABLE 6

Schedule of Daily Benefit Amounts
(Minimum Daily Benefit = $50)

| Patient Category | ADL Range | Cost Index Variable | Cost Index Fixed | Cost Index Total | Daily Benefit |
|---|---|---|---|---|---|
| Extensive Services | | | | | |
| 3+ types of treatment | 7–18 | 3.61 | 1.00 | 4.61 | $164 |
| 2 types of treatment | 7–18 | 2.44 | 1.00 | 3.44 | 123 |
| 1 type of treatment | 7–18 | 1.62 | 1.00 | 2.62 | 93 |
| Rehabilitation | 16–18 | 2.59 | 1.00 | 3.59 | 128 |
| | 7–15 | 2.27 | 1.00 | 3.27 | 116 |
| | 4–6 | 2.01 | 1.00 | 3.01 | 107 |
| Special Care | 17–18 | 1.45 | 1.00 | 2.45 | 87 |
| | 14–16 | 1.33 | 1.00 | 2.33 | 83 |
| | 7–13 | 1.18 | 1.00 | 2.10 | 78 |

TABLE 6-continued

Schedule of Daily Benefit Amounts
(Minimum Daily Benefit = $50)

| Patient Category | ADL Range | Cost Index Variable | Cost Index Fixed | Cost Index Total | Daily Benefit |
|---|---|---|---|---|---|
| Clinically Complex | 17–18 | 1.26 | 1.00 | 2.26 | 80 |
| | 11–16 | 1.07 | 1.00 | 2.07 | 74 |
| | 6–10 | 0.91 | 1.00 | 1.91 | 68 |
| | 4–5 | 0.66 | 1.00 | 1.66 | 59 |
| Cognitive Impairment and/ or Behavior Problems | 6–10 | 0.75 | 1.00 | 1.75 | 62 |
| | 4–5 | 0.47 | 1.00 | 1.47 | 52 |
| Reduced Physical Functions | 16–18 | 1.04 | 1.00 | 2.04 | 73 |
| | 11–15 | 0.91 | 1.00 | 1.91 | 68 |
| | 9–10 | 0.73 | 1.00 | 1.73 | 62 |
| | 6–8 | 0.63 | 1.00 | 1.63 | 58 |
| | 4–5 | 0.40 | 1.00 | 1.40 | 50 |

Step 9. Decision Point. Compute Another Schedule of Benefit Amounts?

If the insurer wishes to compute another Schedule of Benefit Amounts based on a different minimum or maximum benefit amount, return to Step 7. If not, the operation of this invention has been concluded, and System 1 can be directed to forming the documentation 22. (NOTE: After this Step 9, other actuarial assumptions and activities are involved in the development of premium rates, benefit durations, etc. for an insurance plan based on this (these) Schedule(s) of Benefits. Other activities must also be undertaken at the onset of and during a claim to determine the category in which a patient belongs for the purpose of determining the precise benefit amount to be paid to, or on behalf of, the patient. Those assumptions and activities are not part of this invention.)

Thus, it can be seen that this invention provides long-term care patients with an efficient manner of producing and distributing a much more equitable arrangement of benefit amounts than fixed-benefit arrangements because it is much more closely related to the costs they will incur for their care. Some of the many advantages of this invention are its potential to substantially reduce—on a large scale—patients' and/or their families' out-of-pocket expenses, to substantially increase the number of patients who can receive care in their homes rather than in nursing homes, to substantially decrease the number of patients who deplete their assets, turn to Medicaid and are impoverished for the rest of their lives, and if an insurer so desires, to provide the means to adjust benefit amounts to reflect changes in patients' conditions.

While the above description contains many specificities, these should not be construed as limitations on the scope of the invention, but rather as an exemplification of one preferred embodiment thereof. Many other variations are possible, including, but not limited to those set out below:

1. While RUG-III is believed to be the most accurate patient-categorizing model available thus far, other models are currently available as the source of long-term care data for this invention. For example, another model is based only on patients' relative abilities to perform activities of daily living. Another such model is the MEDPAR Analog to the RUG-III Classification System. Whereas RUG-III includes data for both Medicare and Medicaid patients, the MEDPAR Analog is based solely on Medicare patients; MEDPAR excludes both Medicaid and private-pay patients. And, other models may be developed in the future and used as the source of data for this invention.

2. Filters other than those defined in Step 6 can be used to compute benefit amounts. For example, if an insurer wants to base benefits on the costs of providing care to the "average" patient, a sample formula is shown below.

| | | |
|---|---|---|
| X | = | Relative value of the category for which the benefit amount is to be computed. |
| Y | = | "Average" relative value for all categories: (For RUG-III, this means adding the sum of the "average" variable-cost factor of 1.00 to the "average" fixed-cost factor of 1.00, resulting in the "average" total-cost factor of 2.00.) |
| Z | = | "Average" benefit amount to appear in the schedule of benefits. |

Benefit Amount for the Category=(X/Y)×Z

If a filter such as this is used, the desired average benefit amount must be input in Step 7 (see Table 6 above).

3. The benefit amounts computed as Daily Benefits in Step 8 (see Table 6 above) can be expressed either as benefit amounts or as benefit limits. When expressed as benefit amounts, qualifying patients will entitled to the indicated amounts regardless of the cost of the care they receive. When expressed as benefit limits, the cost of qualifying patients' care will be paid up to the indicated limits. Or, a combination of benefit amounts and benefit limits can be used, e.g., qualifying patients can be guaranteed benefit amounts according to their specific condition up to, for example, a maximum of $175 per day, with costs above that amount also being paid up to the indicated benefit limit for that condition. Finally, if benefit amounts are expressed as benefit limits, the costs of patient care used to determine benefit payments can be based either on a patient's actual incurred expenses, or on the reasonable and customary costs for the patient's care, as determined by the average costs to provide the same or essentially similar care to other patients in the same geographic area.

4. Benefit amounts computed in Step 8 (see Table 6 above) can be expressed in repeating periods other than daily. For example, multiplying the daily benefits by 7 would produce weekly benefits; multiplying the daily benefits by 30 would produce monthly benefit amounts, etc.

5. Benefit amounts computed in Step 8 (see Table 6 above) can also be utilized to compute a maximum pool of money available to pay for care received during a given period. For example, the daily benefits can be multiplied by 7, thereby a maximum pool of money available to pay for care received during a week, with no other maximum applied to the amount of care received during each day of the week. As another example, the daily (weekly, monthly, etc.) benefit amount can be multiplied by the total number of days (weeks, months, etc.) in a long-term care insurance plan's maximum benefit period to produce a maximum pool of money available under the policy: (a) for the lifetime of an insured person, or (b) during the duration of care for the insured person's current period of treatment. In the latter example, moneys left unused at the end of the plan's maximum benefit period can be used to continue to pay for care provided after the maximum benefit period has expired until those moneys are exhausted.

Thus, the scope of the invention should be determined by the appended claims and their legal equivalents, rather than by the principal embodiment and other examples described above.

We claim:

1. A method for using a digital electrical computer apparatus to electrically process signals in generating output for insurance documentation, the digital electrical computer apparatus comprising a digital computer having a processor, the processor electrically connected to a memory device for storing and retrieving operations including machine-readable signals in the memory device, to an input device for receiving input data and converting the input data into input electrical data, to a visual display unit for converting output electrical data into output having a visual presentation, to a printer for converting the output electrical data into printed documentation, wherein the processor is programmed to control the apparatus to receive the input data and to produce the output data method including the steps of:

defining a plurality of patient categories; and for each of said categories, determining a periodic duration-specific insurance benefit amount for a long-term care patient, and inserting said periodic duration-specific insurance benefit amounts in a long-term care insurance policy.

2. The method of claim 1, wherein the step of determining includes:

associating a value with each said category; and applying a filter to each said value such that the amounts are scaled solely by the filter.

3. The method of claim 1, wherein the step of inserting is carried out by the apparatus such that the policy is a portion of the documentation corresponding to the machine readable signals in the memory device; and further including the step of computing a premium for the insurance policy.

4. The method of claim 1, wherein the step of defining includes specifying medical conditions for each said category; and further including the step of computing a premium for the insurance policy.

5. The method of claim 1, wherein the step of defining includes specifying physical conditions for each said category; and further including the step of computing a premium for the insurance policy.

6. The method of claim 1, wherein the step of defining includes specifying psychological conditions for each said category; and further including the step of computing a premium for the insurance policy.

7. The method of claim 1, wherein the step of defining includes specifying patient cost for each said category; and further including the step of computing a premium for the insurance policy.

8. The method of claim 1, wherein the step of determining is carried out to reflect a cost for receiving long-term care in a setting other than either a nursing home or nursing facility; and further including the step of computing a premium for the insurance policy.

9. Apparatus for electrically processing signals in generating output for insurance documentation, the apparatus including:

a digital electrical computer system comprising a digital computer having a processor, the processor electrically connected to a memory device for storing and retrieving operations including machine-readable signals in the memory device, to an input device for receiving input data and converting the input data into input electrical data, to a visual display unit for converting output electrical data into output having a visual presentation, to a printer for converting the output electrical data into printed documentation, wherein the processor is programmed to control the apparatus to receive the input data and to produce the output data by defining a plurality of patient categories having one of a maximum benefit amount and a minimum benefit amount, the processor being programmed such that for each of said categories, the processor determines a periodic duration-specific insurance benefit amount for a long-term care patient, the processor being programmed further for inserting said periodic duration-specific insurance benefit amounts in documentation for a long-term care insurance policy.

10. The apparatus of claim 9, wherein the processor is programmed for associating a value with each said category and applying a filter to each said value such that the amounts are scaled solely by the filter; and wherein said insurance policy includes a maximum benefit duration.

11. The apparatus of claim 9, wherein the processor is programmed such that the policy is a portion of the documentation corresponding to the machine readable signals in the memory device.

12. The apparatus of claim 9, wherein the processor is programmed for specifying medical conditions for each said category.

13. The apparatus of claim 9, wherein the processor is programmed for specifying physical conditions for each said category.

14. The apparatus of claim 9, wherein the processor is programmed for specifying psychological conditions for each said category.

15. The method of claim 9, wherein the processor is programmed for specifying patient cost for each said category.

16. The apparatus of claim 9, wherein the processor is programmed for including as the input data cost for receiving long-term care in a setting other than either a nursing home or nursing facility.

17. A method for making an apparatus for electrically processing signals in generating output for insurance documentation, the method including the steps of:

providing a digital electrical computer system comprising a digital computer having a processor, the processor electrically connected to a memory device for storing and retrieving operations including machine-readable signals in the memory device, to an input device for receiving input data and converting the input data into input electrical data, to a visual display unit for converting output electrical data into output having a visual presentation, to a printer for converting the output electrical data into printed documentation, wherein the processor is programmed to control the apparatus to receive the input data and to produce the output data by defining a plurality of patient categories; and for each of said categories, the processor being programmed for determining a periodic duration-specific insurance benefit amount for a long-term care patient(s); the processor being programmed further for inserting said periodic duration-specific insurance benefit amounts in a long-term care insurance policy.

* * * * *

UNITED STATES PATENT AND TRADEMARK OFFICE
CERTIFICATE OF CORRECTION

PATENT NO. : 6,014,632  
DATED : January 11, 2000  
INVENTOR(S) : Gamble and Wilson It is certified that error appears in the above-identified patent and that said Letters Patent is hereby corrected as shown below:

Column 1,
Line 38, "fast" should be -- first --.

Column 3,
Line 8, before "basing", -- not -- should appear.

Column 16,
Line 21, "splint/-brace" should be -- splint/brace --.

Column 18,
Lines 33-38 should read --

Table 5

Adjusted RUG-III Categories, Prevalence, and Variable Cost Indices

| Adjusted RUG-III Category | ADL Range | Prevalence | Variable Cost Index |
|---|---|---|---|
| *All Categories* | 4 - 18 | 100.0% | 1.00 |
| Extensive Services | | 2.1% | 1.97 |
|    3 or more types of treatment | 7 - 18 | 0.2% | 3.61 |
|    2 types of treatment | 7 - 18 | 0.5% | 2.44 |
|    1 type of treatment | 7 - 18 | 1.4% | 1.62 |

UNITED STATES PATENT AND TRADEMARK OFFICE
CERTIFICATE OF CORRECTION

PATENT NO. : 6,014,632
DATED : January 11, 2000
INVENTOR(S) : Gamble and Wilson

It is certified that error appears in the above-identified patent and that said Letters Patent is hereby corrected as shown below:

| | | | |
|---|---|---|---|
| *Rehabilitation* | | *7.2%* | *2.28* |
| | 16 - 18 | 1.1% | 2.59 |
| | 7 - 15 | 5.4% | 2.27 |
| | 4 - 6 | 0.8% | 2.01 |
| *Special Care* | | *10.0%* | *1.36* |
| | 17 - 18 | 4.0% | 1.45 |
| | 14 - 16 | 4.9% | 1.33 |
| | 7 - 13 | 1.2% | 1.18 |
| *Clinically Complex* | | *31.4%* | *0.98* |
| | 17 - 18 | 4.4% | 1.26 |
| | 11 - 16 | 14.1% | 1.07 |
| | 6 - 10 | 6.3% | 0.91 |
| | 4 - 5 | 6.5% | 0.66 |
| *Cognitive Impairment and/or Behavior Problems* | | *11.7%* | *0.61* |
| | 6 - 10 | 5.9% | 0.75 |
| | 4 - 5 | 5.8% | 0.47 |

UNITED STATES PATENT AND TRADEMARK OFFICE
CERTIFICATE OF CORRECTION

PATENT NO.  : 6,014,632  
DATED       : January 11, 2000  
INVENTOR(S) : Gamble and Wilson It is certified that error appears in the above-identified patent and that said Letters Patent is hereby corrected as shown below:

| *Reduced Physical Functions* | | *37.6%* | *0.73* |
|---|---|---|---|
| | 16 - 18 | 7.5% | 1.04 |
| | 11 - 15 | 12.4% | 0.91 |
| | 9 - 10 | 2.3% | 0.73 |
| | 6 - 8 | 2.5% | 0.63 |
| | 4 - 5 | 13.0% | 0.40 |

Step 2. Sort and Summarize Data

If an insurer uses its own unsorted data, or another source's unsorted data, that data must now be sorted and summarized by patient category. In the case of RUG-III, this step can be accomplished as part of redefining patient categories in Step 1 above.

UNITED STATES PATENT AND TRADEMARK OFFICE
CERTIFICATE OF CORRECTION

PATENT NO. : 6,014,632
DATED : January 11, 2000
INVENTOR(S) : Gamble and Wilson

It is certified that error appears in the above-identified patent and that said Letters Patent is hereby corrected as shown below:

Step 3. Decision Point. Determine Relative Values?

In order that a distinct relational benefit amount or benefit limit can be calculated for each patient category, each category must have a distinct value associated with it, and that value must bear a relationship to the values assigned to the other categories. Examples of such values are: the average cost of care per patient, a relative index value based on the average cost of care per patient, a relative index value based on the severity of the category's defined medical condition(s), etc. Thus, if a scale of relative values has not been created, it must be determined or assigned by proceeding to Step 4.

Furthermore, if a scale of relative values has already been created, but needs to be modified, that modification must be made by proceeding to Step 4. On the other hand, if a scale of relative values has already been determined and does not need modification, proceed to Step 5.--

Column 21,
After line 60, the attached 272 page appendix should appear.

Signed and Sealed this

Fourth Day of September, 2001

*Attest:*

*Attesting Officer*

NICHOLAS P. GODICI
*Acting Director of the United States Patent and Trademark Office*